United States Patent [19]

Tengesdal et al.

[11] Patent Number: 4,481,747
[45] Date of Patent: Nov. 13, 1984

[54] ASSEMBLY FOR MOUNTING PLATES TO A FRAMEWORK STRUCTURE

[76] Inventors: Paul Tengesdal, N-4387 Bjerkreim; Sigbjörn Jensen, Raunevegen 5, N-4340 Bryne, both of Norway

[21] Appl. No.: 437,201

[22] Filed: Oct. 28, 1982

[30] Foreign Application Priority Data

Nov. 10, 1981 [NO] Norway .................................. 813792

[51] Int. Cl.³ .................................................. L04C 1/34
[52] U.S. Cl. ...................................... 52/460; 52/461; 52/468
[58] Field of Search ................. 52/471, 472, 460, 461, 52/464, 468

[56] References Cited

U.S. PATENT DOCUMENTS

| 2,186,511 | 1/1940 | Welch ..................................... 52/471 |
| 3,190,407 | 6/1965 | Grisard et al. . |
| 3,538,667 | 11/1970 | Eri . |
| 3,545,154 | 12/1970 | Bobzin ................................... 52/471 |
| 3,687,502 | 8/1972 | Loew ...................................... 52/631 |
| 3,842,560 | 10/1974 | Campbell . |
| 4,063,393 | 12/1977 | Toti ....................................... 52/461 |
| 4,138,808 | 2/1979 | Walkiewicz, Jr. . |

FOREIGN PATENT DOCUMENTS

| 2314139 | 10/1974 | Fed. Rep. of Germany . |
| 244534 | 9/1946 | Switzerland .......................... 52/461 |
| 571129 | 12/1975 | Switzerland .......................... 52/461 |
| 733606 | 7/1955 | United Kingdom .................. 52/461 |

Primary Examiner—Henry E. Raduazo
Attorney, Agent, or Firm—Schwartz, Jeffery, Schwaab, Mack, Blumenthal & Koch

[57] ABSTRACT

For mounting plates (4) to a framework structure, the channel members (1) which constitute the structural members of the framework are adapted to receive fastener members (2), so that plates (4) which are fastened to the framework structure are firmly secured to the frame by the fastener members (2) as a result of friction or a latch connection between the fastener and the channel members (1) which form the framework structure.

7 Claims, 3 Drawing Figures

ASSEMBLY FOR MOUNTING PLATES TO A FRAMEWORK STRUCTURE

The invention relates to an assembly for mounting plates to a framework structure.

In the production of air conditioning systems, for example, a major part of the system constitutes housing for the system components. Such housing structures usually consist of relatively thin metal plates which are secured to a framework of channel members. The plates must be securely fastened to the channel members, because these plates are subjected to large forces of pressure caused by the air pressure in the system in relation to the air pressure on the outside. Moreover, the plates must be fastened so as to prevent air leaks between the plates and the channel members. In addition, the plates must be secured in such manner that the plates also help to stiffen the structure in the direction of the plates.

In the manufacture of known structures of this type, it is conventional to bend or fold a frame reinforcement edge along the margins of the plates, for fitting to the channel members of the framework, and an intermediate member is also utilized as packing to prevent air leaks between the plates and the frame.

The metal plates are secured to the channel members by means of welding, screws or rivets, and it will be easily understood that such methods of manufacturing and joining the members are very expensive and time-consuming.

It is the object of the invention to provide an assembly for mounting plates to a framework structure whereby the plates can be secured to the framework in a rapid, simple and inexpensive manner, without requiring prior reinforcement of the marginal edges of the plates, and whereby the plates can be subjected to large forces without displacing the fastener means, and a satisfactory seal is obtained between the framework and the plates without the use of packing.

This object is obtained in that the channel members which constitute the framework structure are adapted to receive fastener members, and that the plates which are fastened to the framework structure are firmly secured thereto by said fastener members as a result of friction between the fasteners and the channel members which form the framework structure.

In a further development of the invention, the channel member is a double-faced (H-section) member, preferably of symmetrical configuration, adapted for securing plates on both sides thereof, or on only one side thereof without this affecting the retaining force of the channel member.

In yet another further development, the fastener member has a smaller cross section in the central section thereof, extending longitudinally, than in the rest of the fastener, adapted to form a straightening zone.

An embodiment example of the invention is shown in cross section in the accompanying drawings, wherein.

Figure 1:
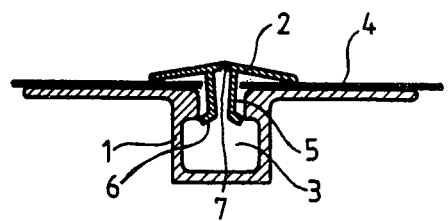
FIG. 1 shows a channel member with associated plates and a fastener member for securing the plates.
Figure 2:
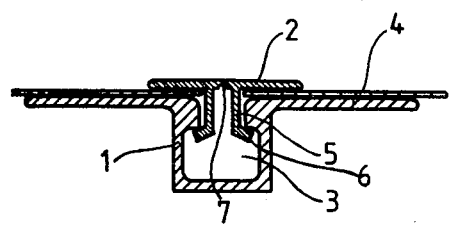
FIG. 2 shows the same channel member with plates and fastener member following securing of the plates.
Figure 3:
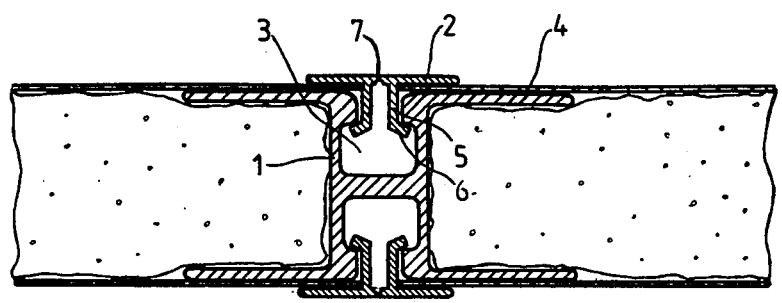
FIG. 3 shows a double-faced channel member with insulation material inserted between plates secured to both sides of the channel member.

The drawing show a channel member 1 which is adapted to receive a fastener member 2 in a slot 3 having a narrower throat portion. After the plates 4 have been placed in position, the fastener member 2 is placed over the edges of the adjoining plates in such manner that two depending, parallel, substantially L-shaped rails 5 on the fastener member 2 project into the slot 3. The L-shaped rails 5 each have a first longer leg connected to the central member 2 and a second, free section, shorter leg 6 forming an obtuse angle with the longer leg (inner section of the rail), the rails facing in opposite directions. Thereafter, the fastener member 2 is flattened or straightened out, a permanent deformation occurring in the straightening zone 7 of the fastener, whereby the outermost, free section 6 of the rails 5 is forced into engagement with the narrow throat of the slot 3, while at the same time the straightened fastener member 2 has full surface contact with the plates 4 and holds these very securely against the channel member 1. The fastener member 2 may for instance be straightened out by means of an air hammer, enabling the plates to be joined to the frame in a very expeditious manner.

Utilizing the assembly of the invention, it is very easy to produce air conditioning systems and other framework structures.

We claim:

1. An assembly for mounting plates (4) to a framework structure wherein channel members (1) constitute the structural members of the framework and said channel members (1) are adapted to receive fastener members (2) for securing the plates (4) thereto, the plates (4) being firmly clamped to the framework structure by means of a latch connection between the fastener members (2) and the channel members (1) forming the framework structure, said channel members (1) being formed with a slot (3) having a narrow throat, and said fastener member (2) being formed with two substantially L-shaped rails (5) adapted to be positioned within the slot (3) and secured thereto, *characterized* in that the outermost, free section (6) of each of the two substantially L-shaped rails (5), which depend from the fastener member (2) and face in opposite directions, forms an obtuse angle with the inner section of the same rail, and that the fastener member (2) is slightly V-shaped and is adapted to be flattened or straightened out, whereby the outermost free section (6) of the rails (5) is pressed outwardly into engagement with the narrow throat of the slot (3) while at the same time the straightened fastener member (2) has full surface contact against the plates (4) and holds these very securely against the channel member (1).

2. A mounting assembly according to claim 1, *characterized* in that the channel members (1) are double-faced and preferably of symmetrical configuration, adapted for securing plates (4) on both sides thereof.

3. A mounting assembly according to claim 1, *characterized* in that the V-shaped fastener member (2) has a smaller cross section in the central section thereof, extending longitudinally, than in the rest of the fastener member (2), adapted to form a straightening zone.

4. In an assembly of a plate mounted to a framework having a channel member, the channel member being formed with a slot having a narrow throat therein, the improvement being in the form of a fastener member comprising:

(a) a central section, (b) a pair of substantially L-shaped rails depending from said central section and facing in opposite directions said rails each having a first longer leg connected to said central portion and a second shorter leg forming an obtuse angle with the first longer leg, (c) said central section being slightly V-shaped and adapted to be flattened or straightened out, whereby said longer legs are pressed outwardly and the shorter legs are pressed into engagement with the narrow throat of the slot while at the same time said central section is being straightened and comes in substantially full surface contract with the plate for securing the plate and channel member together.

5. The assembly of claim 4 wherein the channel member is double-faced and receives a fastener in each channel.

6. The assembly of claim 4 wherein said V-shaped section has a smaller cross-sectional area between said rails to facilitate straightening.

7. The assembly of claim 6 wherein said small cross-sectional area extends longitudinally along said central section.

* * * * *